United States Patent [19]

Choder et al.

[11] 4,246,613
[45] Jan. 20, 1981

[54] ANTI-GLARE SCREEN WITH ELECTROMAGNETIC INTERFERENCE REJECTION

[75] Inventors: Jerome Choder, Southampton, Pa.; Robert H. Pote, Pitman, N.J.; Philip F. Becker, Annandale; Ryerson J. Gewalt, Springfield, both of Va.

[73] Assignee: Delta Data Systems Corporation, Cornwells Heights, Pa.

[21] Appl. No.: 2,269

[22] Filed: Jan. 10, 1979

[51] Int. Cl.³ .......................... H04N 5/65; H04N 5/72
[52] U.S. Cl. .................................. 358/245; 358/253; 358/255
[58] Field of Search ................ 358/245, 252, 253, 255

[56] References Cited

U.S. PATENT DOCUMENTS

| | | | |
|---|---|---|---|
| 2,977,412 | 3/1961 | Rhodes | 358/252 |
| 3,511,560 | 5/1970 | Hamilton | 358/252 |
| 3,952,152 | 4/1976 | Lill | 358/245 |

Primary Examiner—Howard W. Britton
Attorney, Agent, or Firm—Caesar, Rivise, Bernstein & Cohen, Ltd.

[57] ABSTRACT

A non-glare, electromagnetic interference rejecting screen for a video display terminal. The screen comprises a front panel, formed of a transparent material, a rear panel, formed of a transparent material and a woven mesh screen interposed therebetween. A gasket is disposed about the front panel, with peripheral edge portions of the screen extending over the gasket. The screen is mounted on the display terminal so that the wire mesh is interposed between the gasket and the screen retaining frame, e.g., bezel, to form a good electrical interface therebetween. The strands of the screen are disposed at right angles to one another, with none of said strands being disposed horizontally or vertically. The strands are formed of electrically conductive material and are coated with silver. The silver surface is in the form of silver sulfide to give a darkened appearance.

10 Claims, 3 Drawing Figures

U.S. Patent   Jan. 20, 1981   4,246,613
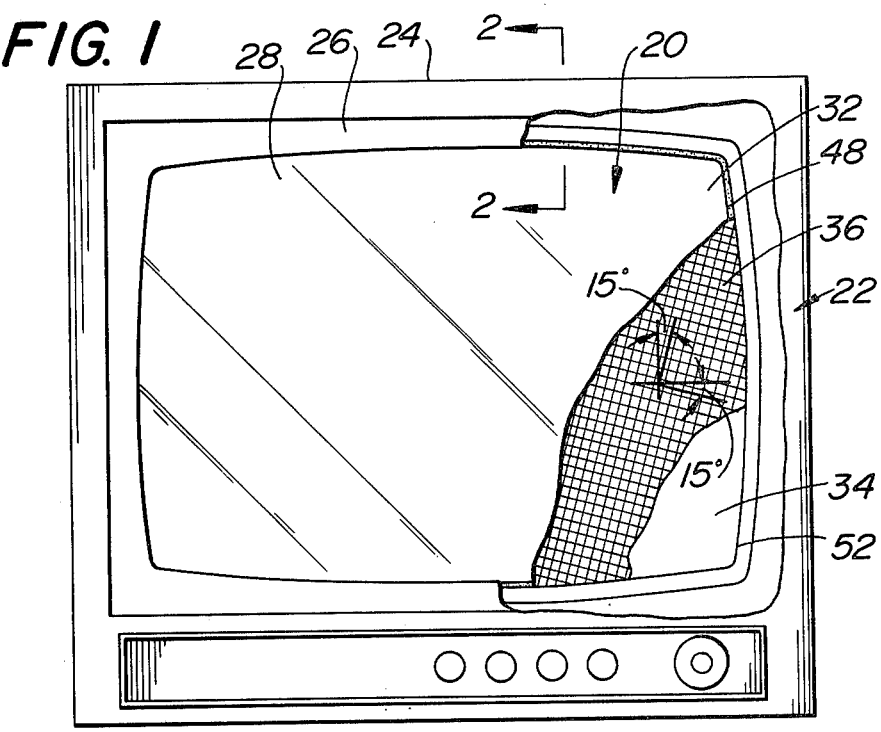
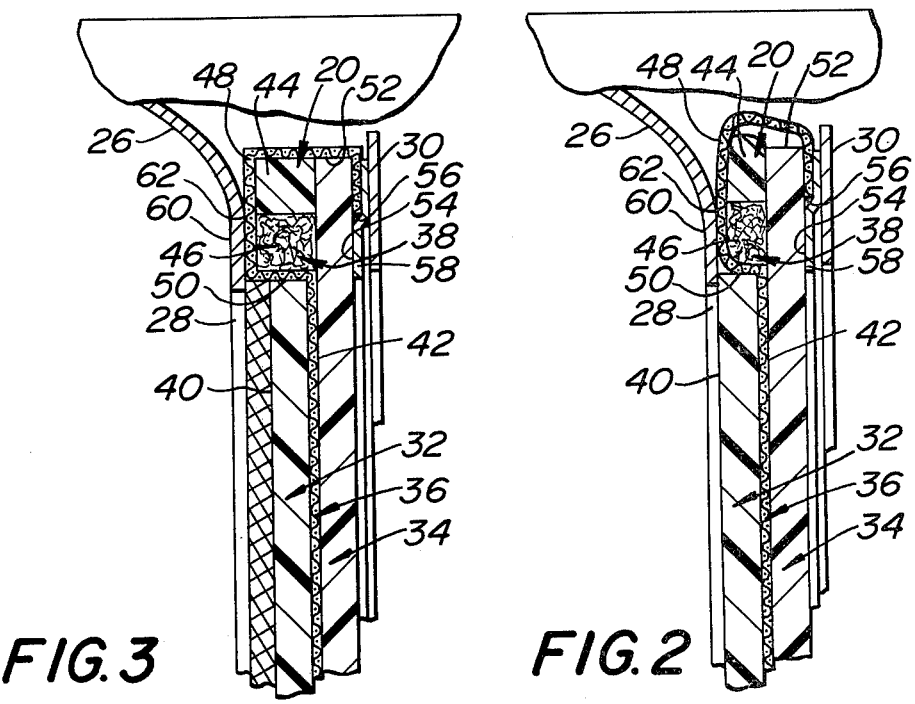

ANTI-GLARE SCREEN WITH ELECTROMAGNETIC INTERFERENCE REJECTION

This invention relates generally to video display terminals and, more particularly, to screens for video display terminals.

Commercially available video display terminals for producing alpha-numerical displays normally include a cathode ray tube to produce the display. As is known, such tubes give off or emanate electromagnetic interference (emi). Video display terminals frequently incorporate means for reducing (attenuating) the emi radiation escaping. For example, one technique used heretofore for rejecting or reducing emi radiation entails disposing a knitted wire mesh screen over the face of the cathode ray tube. Such screens commonly utilize a resilient electrically conductive gasket disposed about the periphery of the screen. The gasket is interposed between the wire mesh of the screen and the electrically conductive bezel or front plate of the terminal case to form a grounded circuit path from the screen to the case.

While such prior art screens do reduce electromagnetic interference radiation somewhat, their action still leaves much to be desired from the standpoint of effectiveness.

Accordingly, it is a general object of the instant invention to provide a screen for a video display terminal which overcomes the disadvantages of the prior art.

It is a further object of this invention to provide a non-glare screen for a video display terminal which is effective for substantially reducing electromagnetic interference emanating therefrom.

It is still a further object of this invention to provide a non-glare, electromagnetic interference rejection screen for a video display terminal which is simple in construction.

These and other objects of the instant invention are achieved by providing a screen for a video display terminal comprising alpha-numeric display means, a case therefor and electrically conductive retaining means for engaging and retaining said screen. The screen is arranged to reduce glare on the display and to attenuate electromagnetic interference emanating from the display means and comprises a transparent front panel, a transparent rear panel, gasket means encircling the periphery of the front panel and a mesh of electrically conductive strands interposed between the panels. The mesh includes peripheral portions extending beyond the periphery of the front panel to overly the gasket and directly contact the retaining means to form an electrically conductive interface therebetween.

Other objects and many of the attendant advantages of the instant invention will be readily appreciated as the same becomes better understood by reference to the following detailed description when considered in connection with the accompanying drawings wherein:

FIG. 1 is a front elevational view of a video display terminal utilizing the screen of the instant invention;

FIG. 2 is an enlarged sectional view taken along line 2—2 of FIG. 1; and

FIG. 3 is an enlarged sectional view, similar to that shown in FIG. 2 but showing the screen of the instant invention prior to its securement in the video display terminal.

Referring now to the various figures of the drawing wherein like reference characters refer to like parts, there is shown at 20 in FIG. 1 a non-glare, electromagnetic interference rejection screen of the instant invention mounted on a conventional video display terminal 22. The terminal 22, being conventional, comprises a cathode ray tube (not shown) for producing the alpha-numerical display, a housing or case 24 for the cathode ray tube and other components (not shown) and a front retaining plate or bezel 26 having an opening 28 through which the face of the cathode ray tube is viewed.

The screen 20 of the instant invention, by virtue of its contruction (to be described in detail later) reduces the glare on the face of the cathode ray tube while also reducing or attenuating the electromagnetic interference emanating from the tube. To that end the screen 20 is disposed over the face of the cathode ray tube by mounting it between the bezel 26 and an interior mounting frame or backing plate 30. In the interest of drawing simplicity only a portion of the backing plate 30 is shown in FIGS. 2 and 3.

As can be seen clearly in FIG. 2 the screen 20 basically comprises a front panel 32, a rear panel 34, a mesh 36 and a gasket 38. The elements making up the screen 20 when connected together are arranged to be disposed over the front face (not shown) of the cathode ray tube display means (not shown). Since the face of conventional cathode ray tubes are curved, each of the panels 32 and 34 and screen 36 is curved so that when assembled the screen's curvature corresponds to the curvature of the face of the cathode ray tube over which it is disposed. The curvature of the panels and the mesh is not shown in the partial sectional views of FIGS. 2 and 3.

The front panel 32 is formed of plastic material which is transparent but preferably dark in color so as to serve as a shade. The outer surface 40 of the front panel is preferably a matte or non-glare finish. The rear panel 34 is also formed of a plastic material which is transparent but is colorless or clear.

As can be seen in FIG. 1 front panel 32 is slightly smaller in size than rear panel 34. The gasket means 38 comprises a ring-like assembly which is mounted on the inside face 42 of the rear panel 34 along the periphery thereof. The gasket means 38 comprises an outer ring 44 formed of an electrically insulative, resilient material, such as Neoprene, and an inner ring, formed of an electrically conductive, resilient material, such as Monel mesh 46. When the panels 32 and 34 are assembled, panel 32 is located within the opening in the center of the gasket means 38.

The mesh 36 is a woven fabric formed of intersecting groups of electrically conductive material strands. The strands intersect each other at right angles. In accordance with the preferred embodiment of the invention the strands are formed of stainless steel wires which are silver plated. The surface of the silver plating is silver sulfide to exhibit a dark colored appearance.

It has been found that a particularly effective electromagnetic interference screen for commercial applications has the following mesh characteristics: stainless steel strands 0.0023 inch (0.058mm) diameter, plated with silver 0.0005-0.0008 inches (0.0127-0.0203 mm) thick and with a silver sulfide surface thickness of 0.0001 inches (0.0025 mm) maximum. The strands are disposed at a density of approximately 100 to the inch to provide an approximately 60% open mesh.

As can be seen in FIGS. 1, 2 and 3 the mesh 36 is interposed between the front panel 32 and the rear panel 34. The peripheral portion 48 of the mesh extends beyond the periphery 50 of the front panel 32 over the gasket means 38, over the peripheral edge 52 of the rear panel and onto the back surface 54 of the rear panel contiguous with the top edge 52. The free edge 56 of the mesh 36 is secured in place to the rear surface 54 of the rear panel 34 via metallic tape 58.

The screen 20 is mounted in the case 22 as follows: The screen is disposed behind the bezel 26 with its peripheral mesh portion 48 and underlying gasket means 38 interposed between the vertically extending lip 60 of the bezel 26 and a vertically extending portion of the backing plate 30 as shown in FIG. 3. Mounting screws (not shown) are tightened to draw the backing plate and bezel together with the periphery of the screen interposed tightly therebetween. This action causes the gasket to compress slightly as shown in FIG. 2 to enable the portion 60 of the bezel contiguous with the opening 28 to engage the front surface 40 of the front panel 32 contiguous with its periphery. This action forms a seal between the front panel 32 and the bezel 26.

The resiliency of the gasket means 38 ensures that the periphery of the wire mesh 36 underlying portion 60 of the bezel forms a good electrically conductive interface 62 therewith. The single interface 62 exhibits a lower impedance to ground through the bezel 26 than accomplished heretofore using the prior art technique of interposing a conductive gasket between the conductive mesh and the bezel. As will be appreciated the latter technique produces two electrical interfaces and a concomittantly higher impedance to ground.

In order to ensure that the mesh 36 does not impede viewing of the face of the cathode ray tube, it has been found that the mesh should be disposed between the panels 32 and 34 so that the intersecting groups of strands forming the mesh are not disposed horizontally or vertically. In this regard it has been found that if the mesh is rotated to the attitude wherein one group of strands extends at approximately 15 degrees to the vertical while the intersecting group of strands extends at 15 degrees to the horizontal (as shown in FIG. 1) a clear and unimpeded view of the cathode ray tube face is effected. Moreover, the dark silver sulfide coating on the mesh of the screen renders the screen unobtrusive and enables the display to be of a high contrast ratio to facilitate the reading thereof.

It must be pointed out at this juncture that the mesh 36 can be formed of different material than stainless steel strands plated with silver. To that end the strands can be formed of alternative electrically conductive and platable materials, e.g., nickel. However, since silver is an extremely good electrical conductor, it is preferred that silver be used to plate the mesh strands. In some applications other good electrical conductors may be used as the plating, if desired. In silver or other shiny plating materials are used, the surface of such materials should be darkened. The darkening of the silver can be effected using a sulfur compound to form a silver sulfide coating, as is preferred, or can be accomplished in alternative ways.

It should also be pointed out at this juncture that the gasket 38 need not be made of the neoprene outer component 44 and the monel mesh inner component 46 shown in the drawings herein. In this regard, in accordance with this invention, all that is required of gasket 38 is that it be resilient. It is not necessary that the gasket be electrically conductive since the electrical connection between the mesh 36 and the bezel 26 is effected by their direct engagement with each other and without any interposed electrically conductive gasket.

Without further elaboration, the foregoing will so fully illustrate our invention that others may, by applying current or future knowledge, readily adapt the same for use under various conditions of service.

What is claimed as the invention is:

1. A screen for a video display terminal, said terminal comprising alpha-numeric display means, a case therefor and electrically conductive retaining means for engaging and retaining said screen, said screen being arranged to reduce glare on said display means and to attenuate electromagnetic interference emanating from said display means, said screen comprising a transparent front panel, a transparent rear panel, gasket means encircling the periphery of said front panel and a mesh of electrically conductive strands interposed between said panels and including peripheral portions extending beyond the periphery of said front panel to overly the gasket and directly engage said retaining means to form an electrically conductive interface therebetween.

2. The screen of claim 1 wherein said strands of said mesh are woven.

3. The screen of claim 2 wherein said strands are coated with silver, said coating being darkened.

4. The screen of claim 3 wherein said darkened coating comprises silver sulfide.

5. The screen of claim 4 wherein said woven strands comprise two groups which intersect at generally right angles to one another, said mesh being oriented so that none of the strands of either group are disposed horizontally or vertically.

6. The screen of claim 5 wherein one of said groups of strands is disposed at approximately 15 degrees to the horizontal and the other group of said strands is disposed at approximately 15 degrees to the vertical.

7. The screen of claim 5 wherein said gasket means is resilient.

8. The screen of claim 5 wherein said rear panel includes a front peripheral surface on which said gasket is disposed and a rear surface, the peripheral portions of said mesh extending fully over said gasket, with the edge portions of said mesh being secured to the rear surface of said rear panel.

9. The screen of claim 8 wherein the edge of said mesh is secured to the rear surface of said rear panel by metallic tape.

10. The screen of claim 9 wherein said gasket means is resilient.

* * * * *